(12) United States Patent
Dan et al.

(10) Patent No.: US 11,021,064 B2
(45) Date of Patent: *Jun. 1, 2021

(54) BATTERY PACK HEATING APPARATUS AND METHOD OF BATTERY PACK HEATING CONTROL

(71) Applicant: Contemporary Amperex Technology Co., Limited, Ningde (CN)

(72) Inventors: Zhimin Dan, Ningde (CN); Xiyang Zuo, Ningde (CN); Wei Zhang, Ningde (CN); Yizhen Hou, Ningde (CN); Wenbin Lu, Ningde (CN); Xingyuan Wu, Ningde (CN); Taosheng Zhu, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 286 days.

This patent is subject to a terminal disclaimer.

(21) Appl. No.: 16/289,436

(22) Filed: Feb. 28, 2019

(65) Prior Publication Data

US 2019/0359061 A1 Nov. 28, 2019

(30) Foreign Application Priority Data

May 22, 2018 (CN) .......................... 201810494764.9

(51) Int. Cl.
*H02J 7/00* (2006.01)
*B60L 3/00* (2019.01)
(Continued)

(52) U.S. Cl.
CPC .......... *B60L 3/0069* (2013.01); *B60L 3/0046* (2013.01); *B60L 58/27* (2019.02); *H01M 10/615* (2015.04);
(Continued)

(58) Field of Classification Search
None
See application file for complete search history.

(56) References Cited

U.S. PATENT DOCUMENTS

| 5,785,137 A | * | 7/1998 | Reuyl | .................. B60W 10/08 180/65.245 |
| 5,787,601 A | * | 8/1998 | Stelly | ..................... A45D 20/44 34/101 |

(Continued)

FOREIGN PATENT DOCUMENTS

| CN | 102074755 A | 5/2011 |
| CN | 203721843 U | 7/2014 |

(Continued)

OTHER PUBLICATIONS

European Search Report dated Aug. 9, 2019, issued in corresponding European Application No. 19159612, 7 pages.

(Continued)

*Primary Examiner* — Arun C Williams
(74) *Attorney, Agent, or Firm* — Christensen O'Connor Johnson Kindness PLLC (57) ABSTRACT

The present disclosure provides a battery pack heating apparatus. The battery pack heating apparatus is applicable portably and externally to a vehicle and includes: an electrical energy conversion component, including an energy storage device, a first set of switches and a second set of switches; a heating interface component including a plurality of heating interfaces connected to the energy storage device via the first set of switches to form a first heating loop and connected to the energy storage device via the second set of switches to form a second heating loop, each of the plurality of heating interfaces being configured to be connected to a battery pack of one vehicle; and a heating control module configured to control a direction of electrical energy (Continued)

transfer between the electrical energy conversion component and the battery pack.

17 Claims, 3 Drawing Sheets

(51) Int. Cl.
 *H01M 10/615* (2014.01)
 *H01M 10/625* (2014.01)
 *H01M 10/657* (2014.01)
 *B60L 58/27* (2019.01)
(52) U.S. Cl.
 CPC ....... *H01M 10/625* (2015.04); *H01M 10/657* (2015.04); *H02J 7/0026* (2013.01); *H01M 2220/20* (2013.01)

(56) References Cited

U.S. PATENT DOCUMENTS

| | | | | |
|---|---|---|---|---|
| 2010/0258063 | A1* | 10/2010 | Thompson | H01M 10/6567 123/41.19 |
| 2011/0214838 | A1* | 9/2011 | Akiyama | H01M 10/663 165/41 |
| 2012/0043754 | A1* | 2/2012 | Gadawski | F16L 55/1157 285/189 |
| 2012/0280659 | A1 | 11/2012 | Xu et al. | |
| 2012/0326663 | A1* | 12/2012 | You | B60L 53/22 320/109 |
| 2013/0134945 | A1 | 5/2013 | Xu et al. | |
| 2013/0280561 | A1* | 10/2013 | Tolkacz | B60K 1/04 429/50 |
| 2014/0153141 | A1* | 6/2014 | Yoon | B60L 3/00 361/42 |
| 2014/0216693 | A1* | 8/2014 | Pekarsky | B60H 1/143 165/104.31 |
| 2015/0001927 | A1* | 1/2015 | Han | B60L 58/27 307/10.7 |
| 2015/0061605 | A1* | 3/2015 | Yamazaki | B60L 3/0046 320/150 |
| 2016/0141733 | A1* | 5/2016 | Shiraishi | G01K 17/20 320/136 |
| 2016/0336561 | A1 | 11/2016 | Miyao et al. | |

FOREIGN PATENT DOCUMENTS

| | | |
|---|---|---|
| CN | 203721849 U | 7/2014 |
| CN | 105539179 A | 5/2016 |
| DE | 10 2015 015 007 A1 | 7/2016 |
| EP | 1 026 769 A2 | 1/2000 |
| KR | 10-2014-0075078 A | 6/2014 |

OTHER PUBLICATIONS

First Office Action dated Aug. 23, 2019, issued in corresponding Chinese Application No. 201810494764.9, filed May 22, 2018, 13 pages.

* cited by examiner

BATTERY PACK HEATING APPARATUS AND METHOD OF BATTERY PACK HEATING CONTROL

CROSS-REFERENCE TO RELATED APPLICATIONS

The present application claims priority to Chinese Patent Application No. 201810494764.9, filed on May 22, 2018, the content of which is incorporated herein by reference in its entirety.

TECHNICAL FIELD

The present disclosure relates to battery technology, and more particularly, to a battery pack heating apparatus and a method of battery pack heating control.

BACKGROUND

Intelligentization and electrification are ones of important directions in the development of intelligent transportation. Especially in the field of electrification, with the improvement in materials and technologies, energy densities of battery packs are becoming higher and higher. Vehicles are using various types of battery packs as their energy sources. Compared with conventional vehicles that mainly use fossil fuels as energy sources, more and more modern vehicles use battery packs such as lithium batteries as their energy sources. Research data has shown that in the environment of −30° C., the charging and discharging performances of a battery pack becomes basically zero. Hence, it is very important to study battery packs to improve the adaptability of vehicles to the environment. Based on the current phenomenon that a low temperature environment has a significant impact on the performance of the battery pack, it has become a focus of the related art to study how to heat the battery pack.

At present, a device for heating a battery pack is generally a built-in device. Depending on different vehicle models and battery packs, a heating device such as a heating film or a liquid device is placed inside or outside the battery pack, and the battery pack is heated indirectly by heating the heating device. An energy source for the heating device of the battery pack is generally taken from a built-in lead acid battery or Alternate Current (AC) commercial electricity.

However, the existing device for heating the battery pack is a built-in indirect heating device. Such heating device can only be used to heat one vehicle, and the indirect heating device has low power, long heating time and low heating efficiency.

SUMMARY

In view of this, the embodiments of the present disclosure provide a battery pack heating apparatus and a method of battery pack heating control, capable of solving the problem in the related art that a single-vehicle indirect heating scheme can only heat one vehicle and has low heating efficiency.

In a first aspect, according to an embodiment of the present disclosure, a battery pack heating apparatus is provided. The battery pack heating apparatus is applicable portably and externally to a vehicle. The battery pack heating apparatus includes: an electrical energy conversion component, including an energy storage device, a first set of switches and a second set of switches; a heating interface component including a plurality of heating interfaces connected to the energy storage device via the first set of switches to form a first heating loop and connected to the energy storage device via the second set of switches to form a second heating loop, each of the plurality of heating interfaces being configured to be connected to a battery pack of one vehicle; and a heating control module configured to control a direction of electrical energy transfer between the electrical energy conversion component and the battery pack.

Further to the above aspect and any of the embodiments, an embodiment is provided, in which the heating interface component further includes: a plurality of main loop switch devices connected in series to the plurality of heating interfaces. Any two neighboring main loop switch devices have one heating interface connected therebetween and any two neighboring heating interfaces have one main loop switch device connected therebetween. A positive connection terminal of the heating interface component is a terminal of the plurality of main loop switch devices that is directly connected with none of the plurality of heating interfaces, and a negative connection terminal of the heating interface component is a terminal of the plurality of heating interfaces that is directly connected with none of the plurality of main loop switch devices. Each of the plurality of main loop switch devices is configured to disable an electrical energy transfer between the battery pack heating apparatus and the battery pack in case of an abnormality.

Further to the above aspect and any of the embodiments, an embodiment is provided, in which the first set of switches includes a first switch device and a second switch device connected to two terminals of the energy storage device, respectively; the first set of switches, the energy storage device and the heating interface component are electrically connected to form the first heating loop; the second set of switches includes a third switch device and a fourth switch device connected to two terminals of the energy storage device, respectively; and the second set of switches, the energy storage device and the heating interface component are electrically connected to form the second heating loop.

Further to the above aspect and any of the embodiments, an embodiment is provided, in which the first switch device has a first terminal connected to a first terminal of the energy storage device and a second terminal electrically connected to a positive plate of the heating interface component; the second switch device has a first terminal connected to a second terminal of the energy storage device and a second terminal electrically connected to a negative plate of the heating interface component; the third switch device has a first terminal connected to a third terminal of the energy storage device and a second terminal electrically connected to the positive plate of the heating interface component, and the fourth switch device has a first terminal connected to a fourth terminal of the energy storage device and a second terminal electrically connected to the negative plate of the heating interface component.

Further to the above aspect and any of the embodiments, an embodiment is provided, in which the battery pack heating apparatus further includes: a current detector having a first terminal connected to a negative connection terminal of the first set of switches and a negative connection terminal of the second set of switches and a second terminal connected to a negative plate of the heating interface component, and configured to detect a current value of the first heating loop or the second heating loop. The heating control module is further configured to obtain the current value detected by the current detector, so as to determine whether an abnormality has occurred based on the current value.

Further to the above aspect and any of the embodiments, an embodiment is provided, in which the battery pack heating apparatus further includes: a protection circuit including a plurality of switch protection components and a protection capacitor component. Each of the plurality of switch protection components is connected in parallel with one switch device of the first set of switches or the second set of switches, and configured to reduce a loss or avoid a damage during a switch-off process of the one switch device. The protection capacitor component includes one or more capacitors, and the protection capacitor component is connected in parallel with the first heating loop and the second heating loop and configured to avoid a voltage peak when the first set of switches or the second set of switches is switched on.

Further to the above aspect and any of the embodiments, an embodiment is provided, in which each of the plurality of heating interfaces is a charging gun.

One of the above solutions has the following advantageous effects.

The battery pack heating apparatus according to the embodiment of the present disclosure includes: an electrical energy conversion component, a plurality of heating interfaces and a heating control module. On one hand, the electrical energy conversion component includes an energy storage device, such that an electrical energy transfer with a battery pack in an electrical vehicle can be established via the heating interfaces. The heating control module controls a direction of the electrical energy transfer between the electrical energy conversion component and the battery pack, such that the battery pack in the vehicle can continuously release and store energy. In this way, the battery pack can be heated directly by means of charging and discharging. During this process, the energy storage device does not need to be provided with any additional energy source or heat source and its energy may come from the battery pack in the electrical vehicle directly. The problem associated with the limited heating efficiency by a low power energy source can be avoided, and the heating efficiency can be improved while saving costs. On the other hand, the battery pack heating apparatus includes a plurality of heating interfaces each connected to a battery pack of one electrical vehicle. Since each of the plurality of heating interfaces is connected in series with the electrical energy conversion component, the electrical energy conversion component can heat a plurality of battery packs simultaneously. As such, compared with the single-vehicle indirect heating scheme in the related art, the solution according to the embodiment of the present disclosure is capable of solving the problem in the related art that the single-vehicle indirect heating scheme can only heat one vehicle and has low heating efficiency.

In a second aspect, according to an embodiment of the present disclosure, a method of battery pack heating control is provided. The method is applied in the battery pack heating apparatus according to the above first aspect. The method is performed by the heating control module and includes: detecting a connection state between each of the plurality of heating interfaces in the heating interface component and a battery pack; obtaining security detection information for the battery pack in a fully connected state; and controlling an on/off state of the first set of switches and an on/off state of the second set of switches in response to the security detection information for the battery pack being normal, such that at least one heating sub-cycle is performed in a heating process for the battery pack until a predetermined heating condition is met. The method includes, in each heating sub-cycle: switching on the first set of switches and switching off the second set of switches, such that a first electrical energy transfer is conducted between the energy storage device and the battery pack via the heating interface component; and switching off the first set of switches and switching on the second set of switches in response to a predetermined electrical energy transfer condition being met, such that a second electrical energy transfer is conducted between the energy storage device and the battery pack via the heating interface component. Each of the first electrical energy transfer and the second electrical energy transfer is charging or discharging and the first electrical energy transfer and the second electrical energy transfer have different directions.

Further to the above aspect and any of the embodiments, an embodiment is provided, in which the method further includes: performing a step of switching on the first set of switches and switching off the second set of switches in a next heating sub-cycle in response to the predetermined electrical energy transfer condition being met.

Further to the above aspect and any of the embodiments, an embodiment is provided, in which the predetermined electrical energy transfer condition includes: a predetermined energy storage ratio threshold or energy release threshold of the energy storage device being met; or a predetermined electrical energy transfer time length being reached. The predetermined electrical energy transfer time length includes a discharging time length of the energy storage device and a charging time length of the energy storage device.

Further to the above aspect and any of the embodiments, an embodiment is provided, in which the security detection information includes at least one of insulation impedance detection information, minimum state of charge detection information of the battery pack, a temperature of the battery pack or a voltage of the battery pack.

Further to the above aspect and any of the embodiments, an embodiment is provided, in which the method further includes: obtaining state information of the battery pack; and disabling an electrical energy transfer between the battery pack and the energy storage device in response to any one or more pieces of state information in the state information being abnormal, so as to stop a current heating action.

Further to the above aspect and any of the embodiments, an embodiment is provided, in which the state information includes at least one of a voltage, a temperature of the battery pack, insulation impedance information, a state of charge or a current.

Further to the above aspect and any of the embodiments, an embodiment is provided, in which the operation of disabling the electrical energy transfer between the battery pack and the energy storage device includes: switching off the first set of switches and switching off the second set of switches.

Further to the above aspect and any of the embodiments, an embodiment is provided, in which, when the heating interface component further includes a plurality of main loop switch devices connected in series to the plurality of heating interfaces, any two neighboring main loop switch devices having one heating interface connected therebetween and any two neighboring heating interfaces having one main loop switch device connected therebetween, a positive connection terminal of the heating interface component being a terminal of the plurality of main loop switch devices that is directly connected with none of the plurality of heating interfaces, and a negative connection terminal of the heating interface component being a terminal of the plurality of heating interfaces that is directly connected with none of the plurality of main loop switch devices, the operation of disabling the electrical energy transfer between the battery pack and the energy storage device includes: switching off the plurality of main loop switch devices and switching off the first set of switches and the second set of switches.

Further to the above aspect and any of the embodiments, an embodiment is provided, in which the predetermined heating condition includes: at least one of a plurality of battery packs having a temperature reaching a predetermined heating temperature threshold.

One of the above solutions has the following advantageous effects.

With the method of battery pack heating control according to the embodiment of the present disclosure, the direction of the electrical energy transfer between the electrical energy conversion component and the battery pack can be controlled by controlling the on/off state of each of the first switch device and the second switch device in the electrical energy conversion component. When the first switch device and the second switch device are both switched on, the energy storage device receives electrical energy from the battery pack. When the first switch device and the second switch device are both switched off, the energy storage device is discharged to the battery pack. As such, by performing a plurality of such heating sub-cycles, the battery pack can continuously release and store energy. In this way, the battery pack can be heated directly by means of charging and discharging. During this process, the energy storage device does not need to be provided with any additional energy source or heat source and its energy may come from the battery pack in the electrical vehicle directly. The problem associated with the limited heating efficiency by a low power energy source can be avoided, and the heating efficiency can be improved while saving costs. Since each of the plurality of heating interfaces is connected in series with the electrical energy conversion component, the electrical energy conversion component can heat a plurality of battery packs simultaneously. As such, compared with the single-vehicle indirect heating scheme in the related art, the solution according to the embodiment of the present disclosure is capable of solving the problem in the related art that the single-vehicle indirect heating scheme can only heat one vehicle and has low heating efficiency.

BRIEF DESCRIPTION OF DRAWINGS

In order to more clearly illustrate technical solutions of embodiments of the present disclosure, the accompanying drawings used in the embodiments are briefly described below. The drawings described below are merely a part of the embodiments of the present disclosure. Based on these drawings, those skilled in the art can obtain other drawings without any creative effort.

DESCRIPTION OF EMBODIMENTS

In order to better understand technical solutions of the present disclosure, the embodiments of the present disclosure are described in details with reference to the drawings.

It should be clear that the described embodiments are merely part of the embodiments of the present disclosure rather than all of the embodiments. All other embodiments obtained by those skilled in the art without paying creative labor shall fall into the protection scope of the present disclosure.

The terms used in the embodiments of the present disclosure are merely for the purpose of describing specific embodiment, rather than limiting the present disclosure. The terms "a", "an", "the" and "said" in a singular form in the embodiments of the present disclosure and the attached claims are also intended to include plural forms thereof, unless noted otherwise.

It should be understood that the term "and/or" used in the context of the present disclosure is to describe a correlation relation of related objects, indicating that there may be three relations, e.g., A and/or B may indicate only A, both A and B, and only B. In addition, the symbol "/" in the context generally indicates that the relation between the objects in front and at the back of "/" is an "or" relationship.

It should be understood that although a switch device may be described using the terms 'first', 'second', 'third', etc., in the present disclosure, the switch device should not be limited to these terms. These terms are used only to distinguish the switch devices from each other. For example, without departing from the scope of the embodiments of the present disclosure, a first switch device may also be referred to as a second switch device. Similarly, the second switch device may also be referred to as the first switch device.

Depending on the context, the term "if" as used herein can be interpreted as "when", "in a case where", "in response to determining . . . " or "in response to detecting . . . ". Similarly, depending on the context, the phrase "if it is determined . . . " or "if it is detected . . . (a statement of a condition or event)" can be interpreted as "when it is determined . . . ", "in response to determining . . . ", "when it is detected . . . (a statement of a condition or event)", or "in response to detecting . . . (a statement of a condition or event)".

In order to solve the problem in the related art that a single-vehicle indirect heating scheme can only heat one vehicle and has low heating efficiency, the following idea is provided according to an embodiment of the present disclosure. A direct heating device including a plurality of heating interfaces and having energy coming from a battery pack itself, and a control method thereof, can be provided. The heating device is provided in a space external to a vehicle in a portable manner. During a heating process, energy in battery packs of respective vehicles that are connected in series with each other can be stored and released cyclically. During the energy storing and releasing process, the battery packs of the respective vehicles will be heated continuously, such that battery packs of a plurality of vehicles can be heated simultaneously.

In accordance with the above idea, the following feasible embodiments are provided in the present disclosure.

Embodiment 1

According to an embodiment of the present disclosure, a battery pack heating apparatus is provided. The battery pack heating apparatus can be a portable device that can be provided externally to a vehicle. Here, "externally to a vehicle" means an area outside a housing of the vehicle. Here, the vehicle may include, but not limited to, an electrical automobile, an electrical flying device, an electrical water transportation device or the like. The embodiment of the present disclosure is not limited to this. For the purpose of illustration, for an electrical automobile as an example, the portable heating device can be provided under, in on, in front of or behind the automobile. The embodiment of the present disclosure is not limited to this. For practicality and aesthetics, it can be provided portably under the automobile.

Figure 1:
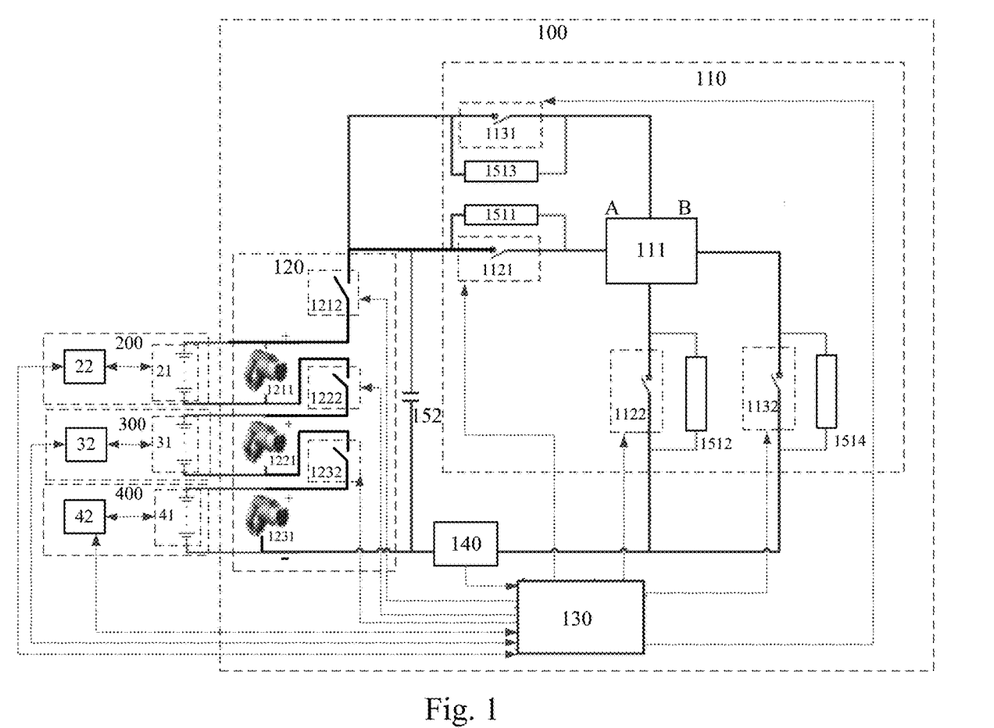
FIG. 1 is a schematic diagram showing a structure of a battery pack heating apparatus according to an embodiment of the present disclosure.
Figure 3:
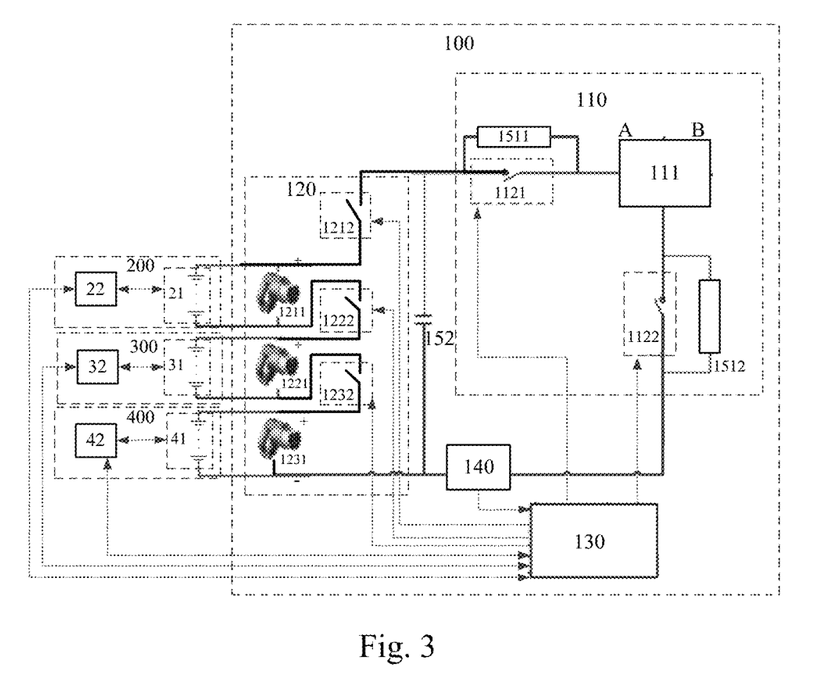
FIG. 3 is a schematic diagram showing a structure of a first heating loop in a battery pack heating apparatus according to an embodiment of the present disclosure.

The battery pack heating apparatus according to the embodiment of the present disclosure can be used for heating a plurality of vehicles. In particular, referring to FIG. 1, the battery pack heating apparatus 100 includes:

an electrical energy conversion component 110, including an energy storage device 111, a first set of switches 112 (shown in FIG. 1 as 1121 and 1122) and a second set of switches 113 (shown in FIG. 1 as 1131 and 1132);

a heating interface component 120 including a plurality of heating interfaces (three heating interfaces are shown in FIG. 3 for the purpose of illustration: a first heating interface 1211, a second heating interface 1221 and a third heating interface 1231) connected to the energy storage device 111 via the first set of switches 112 to form a first heating loop and connected to the energy storage device 111 via the second set of switches 113 to form a second heating loop, each of the plurality of heating interfaces being configured to be connected to a battery pack (shown in FIG. 1 as 21, 31 and 41) of one vehicle (shown in FIG. 1 as 200, 300 and 400); and a heating control module 130 configured to control a direction of electrical energy transfer between the electrical energy conversion component 110 and the battery pack.

Here, the energy storage device 111 is a device that can be configured to receive and output electrical energy. The direction of electrical energy transfer by the electrical energy conversion component 110 may include storing energy (charging) or releasing energy (discharging). The embodiment of the present disclosure is not limited to any form of energy storage device. For example, the form of the energy storage device may include, but not limited to, a combination of one or more inductive devices connected in series or in parallel, or a portable mobile power source device.

In an embodiment of the present disclosure, the heating interface may have a form of a charging gun. The charging gun can be connected to a charging socket in an electrical vehicle and connected to a battery pack via the charging socket. By using a charging gun as the heating interface, the need for providing an additional interface can be avoided. Further, it can be compatible with most of electrical vehicles, which greatly improves the compatibility of the battery pack heating apparatus and extends its application scenarios.

In order to explain the solution in further detail, on one hand, referring to FIG. 1, the embodiment of the present disclosure gives a specific structure of the heating interface component 120.

As shown in FIG. 1, each of the plurality of heating interfaces is connected to a battery pack of one vehicle. Further, the plurality of heating interfaces can be electrically connected with each other in series. When at least two of the plurality of heating interfaces are connected to the battery packs, these connected battery packs form series-connected battery packs.

Figure 2:
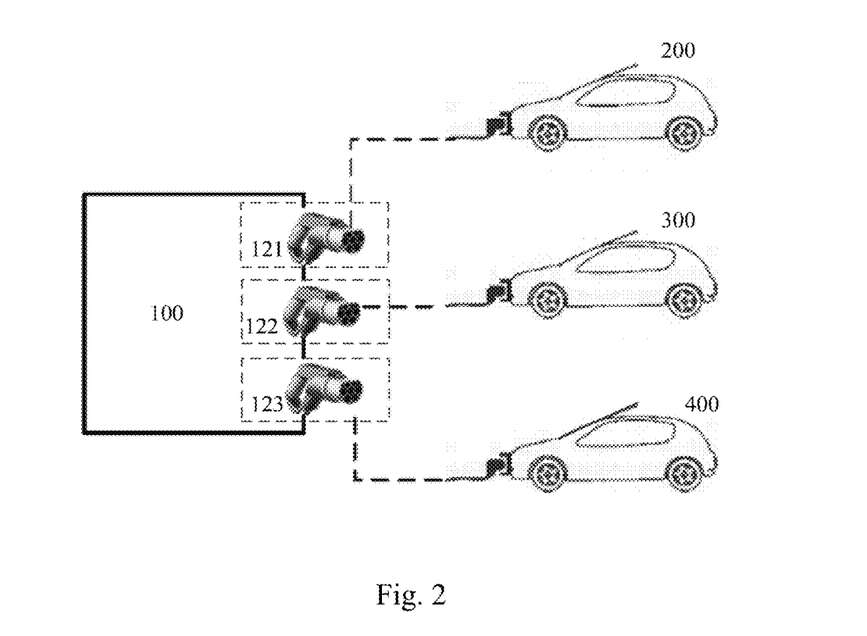
FIG. 2 is a schematic diagram showing connectivity between a battery pack heating apparatus according to an embodiment of the present disclosure and electrical vehicles.

In this case, referring to the structures shown in FIG. 1 and FIG. 2 (FIG. 2 does not show the connectivity between electrical vehicles and battery packs), the battery pack heating apparatus 100 includes three heating interfaces: a first heating interface 1211, a second heating interface 1221 and a third heating interface 1231. Here, the first heating interface 1211 is connected to a battery pack 21 of a first vehicle 200, the second heating interface 1221 is connected to a battery pack 31 of a second vehicle 300, and the third heating interface 1231 is connected to a battery pack 41 of a third vehicle 400.

It is to be noted here that the electrical connection as used herein means that electrical devices can be electrically connected either directly or indirectly. This also applies to all references to "electrical connection" hereinafter.

Moreover, any heating interface that does not need to be connected to a battery pack can be shorted. For example, a battery pack heating apparatus may include five heating interfaces and can thus heat battery packs of five electrical vehicles simultaneously. When each of the battery packs of the five electrical vehicles is connected to one of the heating interfaces, the battery packs of the five electrical vehicles are connected in series. Alternatively, the battery pack heating apparatus can be connected to less than five battery packs. For example, three of the five heating interfaces can be connected to battery packs and the other two interfaces can be shorted. In this case, the battery packs of three vehicles are electrically connected in series as shown in FIG. 1.

That is, the battery heating system can heat at least one battery pack of at least one vehicle, and has a good compatibility.

Further, in a particular implementation scenario, a main loop switch device can be provided on a side of a positive plate of each heat interface, such that the main loop switch can be switched off timely in case of an abnormality, thereby cutting off the electrical energy transfer between the battery pack heating apparatus and the battery packs and stopping the process of heating the battery packs.

In this case, the heating interface component further includes a plurality of main loop switch devices connected in series to the heating interfaces. Any two neighboring main loop switch devices have one heating interface connected therebetween and any two neighboring heating interfaces have one main loop switch device connected therebetween. A positive connection terminal of the heating interface component is a terminal of the plurality of main loop switch devices that is directly connected with none of the heating interfaces, and a negative connection terminal of the heating interface component is a terminal of the heating interfaces that is directly connected with none of the plurality of main loop switch devices. Each of the plurality of main loop switch devices is configured to disable an electrical energy transfer between the battery pack heating apparatus and the battery pack in case of an abnormality.

Referring to FIG. 1, a first main loop switch device 1212, the first heating interface 1211, a second main loop switch device 1222, the second heating interface 1221, a third main loop switch device 1232 and the third heating interface 1231 are connected in series sequentially in the direction from a positive plate to a negative plate in the heating interface component 120. The second main loop switch device 1222 is provided between the first heating interface 1211 and the second heating interface 1221, and the first heating interface 1211 is connected between the first main loop switch device 1212 and the second main loop switch device 1222. The terminal of the first main loop switch device 1212 that is away from the first heating interface 1211 is a positive connection terminal of the entire heating interface component 120, and the terminal of the third heating interface 1231 that is away from the third main loop switch device 1232 is a negative connection terminal of the entire heating interface component 120.

On the other hand, the embodiment of the present disclosure gives a specific structure of the electrical energy conversion component 110.

As shown in FIG. 1 and FIG. 3, in the electrical energy conversion component 110, the first set of switches includes a first switch device 1121 and a second switch device 1122 connected to two terminals of the energy storage device 111, respectively. The first set of switches (the first switch device 1121 and the second switch device 1122), the energy storage device 111 and the heating interface component 120 are electrically connected to form the first heating loop.

In particular, as shown in FIG. 1 and FIG. 3, in the first set of switches, the first switch device 1121 has a first terminal connected to a first terminal of the energy storage device 111 and a second terminal electrically connected to a positive plate of the heating interface component 120. The second switch device 1122 has a first terminal connected to a second terminal of the energy storage device 111 and a second terminal electrically connected to a negative plate of the heating interface component 120. As such, the first switch device 1121, the energy storage device 111, the second switch device 1122 and the heating interface component 120 are electrically connected to constitute the complete first heating loop.

Figure 4:
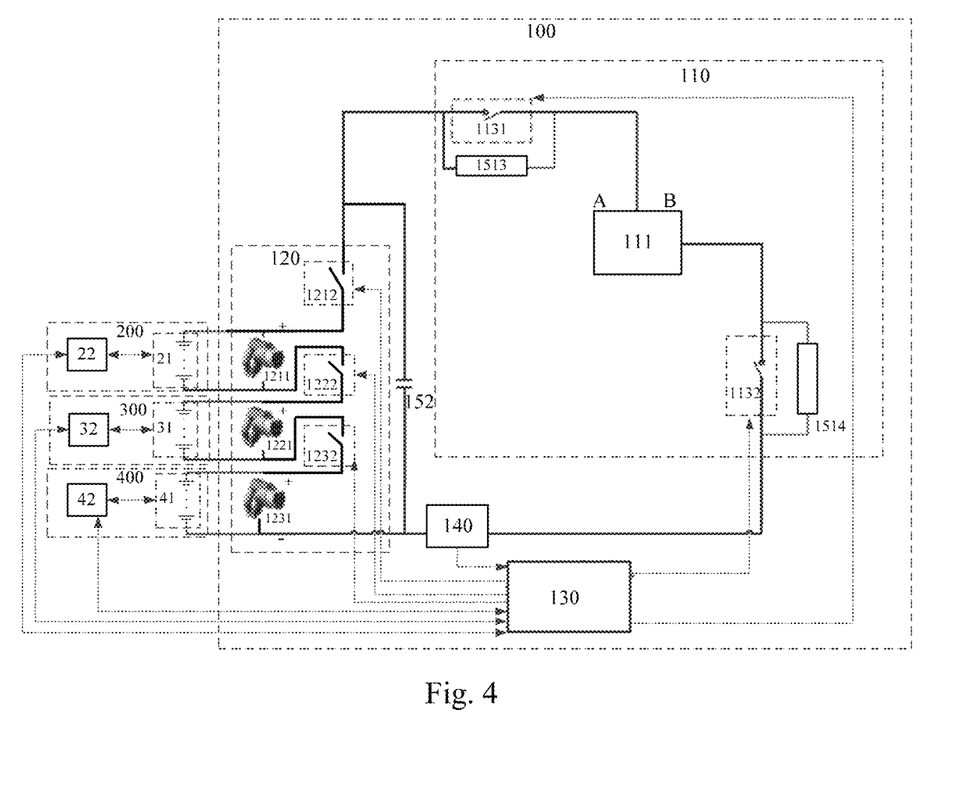
FIG. 4 is a schematic diagram showing a structure of a second heating loop in a battery pack heating apparatus according to an embodiment of the present disclosure.

As shown in FIG. 1 and FIG. 4, in the electrical energy conversion component 110, the second set of switches includes a third switch device 1131 and a fourth switch device 1132 connected to two terminals of the energy storage device 111, respectively. The second set of switches (the third switch device 1131 and the fourth switch device 1132), the energy storage device 111 and the heating interface component 120 are electrically connected to form the second heating loop.

In particular, as shown in FIG. 1 and FIG. 4, in the second set of switches, the third switch device 1131 has a first terminal connected to a third terminal of the energy storage device 111 and a second terminal electrically connected to the positive plate of the heating interface component 120. The fourth switch device 1132 has a first terminal connected to a fourth terminal of the energy storage device 111 and a second terminal electrically connected to the negative plate of the heating interface component 120. As such, the third switch device 1131, the energy storage device 111, the fourth switch device 1132 and the heating interface component 120 are electrically connected to constitute the complete second heating loop.

In this way, in a practical heating process, the on/off state of the first set of switches and the on/off state of the second set of switches can be controlled, such that at least one heating sub-cycle is performed in a heating process for the battery pack until a predetermined heating condition is met.

Here, the on/off state of the first set of switches is opposite to the on/off state of the second set of switches. That is, when the first set of switches is switched on, the second set of switches is switched off. When the first set of switches is switched off, the second set of switches is switched on.

Hence, in each heating sub-cycle, the first set of switches can be switched on and the second set of switches can be switched off, such that a first electrical energy transfer is conducted between the energy storage device and the battery pack via the heating interface component. The first set of switches is switched off and the second set of switches is switched on in response to a predetermined electrical energy transfer condition being met, such that a second electrical energy transfer is conducted between the energy storage device and the battery pack via the heating interface component. Each of the first electrical energy transfer and the second electrical energy transfer is charging or discharging and the first electrical energy transfer and the second electrical energy transfer have different directions.

Further, in response to the predetermined electrical energy transfer condition being met during the second electrical energy transfer, a step of entering a next heating sub-cycle, i.e., switching on the first set of switches and switching off the second set of switches, is performed.

In this way, cyclically, the battery packs of a plurality of vehicles can be heated directly and simultaneously.

Before the method begins, the first set of switches and the second set of switches are both switched off initially.

In this case, since there is no or little energy stored in the energy storage device, a connected battery pack (referred to as PACK hereinafter for simplicity) can supply electrical energy to the energy storage device 111 first.

In particular, the heating control module 130 can switch on the first set of switches 112, with the second set of switches 113 still switched off. In this case, the PACK, the first switch device 1121, the second switch device 1122 and the energy storage device 111 form a heating loop. At this time, the PACK supplies electrical energy to the energy storage device 111 via the heating loop. That is, in the heating loop, a current flows from the positive plate to the negative plate outside the PACK, i.e., from the negative plate to the positive plate inside the PACK. As no other heating device, such as a PTC board, is provided in the PACK, the heat produced by the PACK charging the energy storage device 111 will be dispersed uniformly to the PACK. In this way, each pack in the PACK can be directly heated while being charged and discharged.

Further, it can be seen from the circuit structure shown in FIGS. 1, 3 and 4 that there is no energy consuming device other than the internal resistance $R_x$ in the heating loop. According to the Joule's Law, $Q=I^2R_xT$, the heating value Q is proportional to an effective current value I in the heating loop, a heating resistance $R_x$ and heating time T. Thus, when the heating resistance $R_x$ and the heating value Q are constant, the effective current value I in the heating loop can depend on the heating time T Then, when the energy storage device 111 reaches a predetermined electrical energy transfer condition, the energy storage device 111 can release energy to charge the PACK.

In this case, the heating control module 130 can switch off the first set of switches 112 and switch off the second set of switches 113. At this time, the terminal B of the energy storage device 111 corresponds to a positive plate of the power source, and the energy storage device 111, the third switch device 1131, the fourth switch device 1132 and the PACK form a heating loop. At this time, the energy storage device 111 releases energy to the PACK for charging the PACK. In this heating loop, a current flows from the terminal B of the energy storage device 111, via the fourth switch device 1132, the PACK and the third switch device 1131, and finally back to the terminal A of the energy storage device 111. The heat produced during this process will be dispersed uniformly to the PACK. In this way, each pack in the PACK can be directly heated while being charged and discharged.

Further, similarly to the case where the energy storage device 111 stores energy, in the loop where the energy storage device 111 releases energy to charge the PACK, the effective current value I can depend on the heating time T and details thereof will be omitted here.

In a practical process in which the battery pack heating apparatus according to the embodiment of the present disclosure heats the battery pack, the above two steps can be performed cyclically until the temperature of the battery pack satisfies a requirement.

In a practical scenario, the heating control module can collect information on heating conditions of the respective switch devices, such that a protection measure can be taken in case of an abnormal heating condition in any of the switch devices. Here, as a non-limiting example, the information on the heating conditions of the respective switch devices can be collected by thermistors provided on surfaces of the respective switch devices.

In an implementation, as a current abnormality problem may occur when the battery packs of a plurality of vehicles are directly heated simultaneously by means of charging and discharging, the battery pack heating apparatus can further include a current detector.

In this case, as shown in FIG. 1, the battery pack heating apparatus 100 can further include: a current detector 140 having a first terminal connected to a negative connection terminal of the first set of switches and a negative connection terminal of the second set of switches and a second terminal connected to a negative plate of the heating interface component 120, and configured to detect a current value of the heating loop. The heating control module 130 is further configured to obtain the current value detected by the current detector 140, so as to determine whether an abnormality has occurred based on the current value.

That is, as shown in FIGS. 1, 3 and 4, the current detector 140 can be connected communicatively with the heating control module 130 to transmit the collected current value to the heating control module 130, such that the heating control module 130 can enable an overcurrent protection function based on the received current value, thereby improving the security of the battery pack heating apparatus 100.

When the heating control module detects an abnormality, it can take a protection measure, including disconnecting the battery pack heating apparatus from the battery. In particular, there can be two schemes.

In a first scheme, the first set of switches and the second set of switches are switched off directly.

In a second scheme, when a plurality of main loop switch devices are provided in the heating interface component, the main loop switch devices can be switched off first and then the first set of switches and the second set of switches can be switched off.

In a feasible implementation, in order to disable the heating process more timely, any of the main loop switch devices can be switched off first. Then, all the switch devices, including other main loop switch devices, the first set of switches and the second set of switches, can be switched off.

Further, since a switch-off loss or an overvoltage damage due to a voltage exceeding a maximum voltage may occur during the process of switching off the switch devices, the battery pack heating apparatus may further include, but not limited to, a protection circuit. In particular, the protection circuit may include at least one switch protection component and a protection capacitor component.

Here, as shown in FIGS. 1, 3 and 4, the connectivity and function of the switch protection components in the protection circuit are as follows.

Each of the switch protection components 151 (shown in FIGS. 1, 3 and 4 as 1511, 1512, 1513 and 1514) is connected in parallel with one switch device (1121 and 1122, and 1131 and 1132) of the first set of switches or the second set of switches, and configured to reduce a loss or avoid a damage during a switch-off process of the one switch device (1121, 1122, 1131 or 1132).

As shown in FIG. 1, the electrical energy conversion component 110 has four switch protection components: a first switch protection component 1511 connected in parallel with the first switch device 1121, a second switch protection component 1512 connected in parallel with the second switch device 1122, a third switch protection component 1513 connected in parallel with the third switch device 1131, and a fourth switch protection component 1514 connected in parallel with the fourth switch device 1132.

Each of the switch protection components in the embodiment of the present disclosure can be an RCD absorption circuit including a resistor Rs, a capacitor Cs and a diode VDs. Depending on the connectivity among the respective electrical devices in the RCD absorption circuit, different effects can be achieved.

For example, an RCD absorption circuit having the diode and the capacitor connected in series and the resistor connected in parallel with the diode can slow the rising of voltage when the power tube is switched off, thereby reducing the switch-off loss.

In another example, an RCD absorption circuit having the diode and the capacitor connected in series and the resistor connected in parallel with the capacitor can limit the maximum voltage when the power tube is switched off, thereby preventing the power tube from damage due to switch-off overvoltage.

Further, as shown in FIGS. 1, 3 and 4, the connectivity and function of the protection capacitor component in the protection circuit are as follows.

The protection capacitor component 152 includes one or more protection capacitors. The protection capacitor component 152 is connected in parallel with the first heating loop and the second heating loop and configured to avoid a voltage peak when the first set of switches or the second set of switches is switched on.

In an embodiment of the present disclosure, the protection capacitor component 152 can include one or more protection capacitors. For the purpose of illustration, FIG. 1 shows connectivity of the protection capacitor component 152 including only one protection capacitor. When the protection capacitor component 152 includes a plurality of protection capacitors, the plurality of capacitors can be connected with each other in series and/or in parallel.

Here, when the battery pack heating apparatus includes a current detector, referring to FIGS. 1, 3 and 4, the protection capacitor component 152 has a first terminal connected to the positive connection terminal of the first switch component and the positive connection terminal of the second switch component, and a second terminal connected to the second terminal of the current detector 140. The first terminal of the current detector 140 is connected to the negative connection terminal of the first set of switches 112 and the negative connection terminal of the second set of switches 113.

It can be appreciated that, when the battery pack heating apparatus 100 includes no current detector, the protection capacitor component 152 has a first terminal connected to the positive connection terminal of the first switch component 112 and the positive connection terminal of the second switch component 113, and a second terminal connected to the negative connection terminal of the first set of switches 112 and the negative connection terminal of the second set of switches 113.

Further, in a practical industrial application process, the protection capacitor component can arranged as close to the first set of switches and the second set of switches as possible and as far away from the battery pack as possible, so as to reduce the impact of parasitic parameters of the wiring and the device on the capacitor as much as possible, thereby reducing security risks.

On the other hand, as an electrical vehicle is typically provided with a Battery Management System (BMS), the BMS can be used to collect security performance related parameters, such as the temperature, voltage and insulation impedance of the battery pack. These parameters can assist the heating control module 130 in security decision and protection for the battery pack heating apparatus 100.

Hence, in a practical implementation, as shown in FIG. 1, the heating control module 130 is further connected to the BMSs (22, 32 and 42) of the respective vehicles (shown in FIG. 1 as 200, 300 and 400) communicatively. The communication can include, but not limited to, Controller Area Network (CAN) bus communications.

Regarding the control method performed by the heating control module that has not been described in the embodiment of the present disclosure, reference can be made to the method of battery pack heating control according to Embodiment 2.

The solution according to the embodiment of the present disclosure has the following advantageous effects.

The battery pack heating apparatus according to the embodiment of the present disclosure includes: an electrical energy conversion component, a plurality of heating interfaces and a heating control module. On one hand, the electrical energy conversion component includes an energy storage device, such that an electrical energy exchange with a battery pack in an electrical vehicle can be established via the heating interfaces. The heating control module controls a direction of the electrical energy transfer between the electrical energy conversion component and the battery pack, such that the battery pack in the vehicle can continuously release and store energy. In this way, the battery pack can be heated directly by means of charging and discharging. During this process, the energy storage device does not need to be provided with any additional energy source or heat source and its energy may come from the battery pack in the electrical vehicle directly. The problem associated with the limited heating efficiency by a low power energy source can be avoided, and the heating efficiency can be improved while saving costs. On the other hand, the battery pack heating apparatus includes a plurality of heating interfaces each connected to a battery pack of one electrical vehicle. Since each of the plurality of heating interfaces is connected in series with the electrical energy conversion component, the electrical energy conversion component can heat a plurality of battery packs simultaneously. As such, compared with the single-vehicle indirect heating scheme in the related art, the solution according to the embodiment of the present disclosure is capable of solving the problem in the related art that the single-vehicle indirect heating scheme can only heat one vehicle and has low heating efficiency.

Embodiment 2

Based on the battery pack heating apparatus according to the above Embodiment 1, a method of battery pack heating control and a computer readable storage medium are provided according to an embodiment of the present disclosure.

The method of battery pack heating control can be applied in the battery pack heating apparatus according to Embodiment 1 and can be performed by the heating control module.

Figure 5:
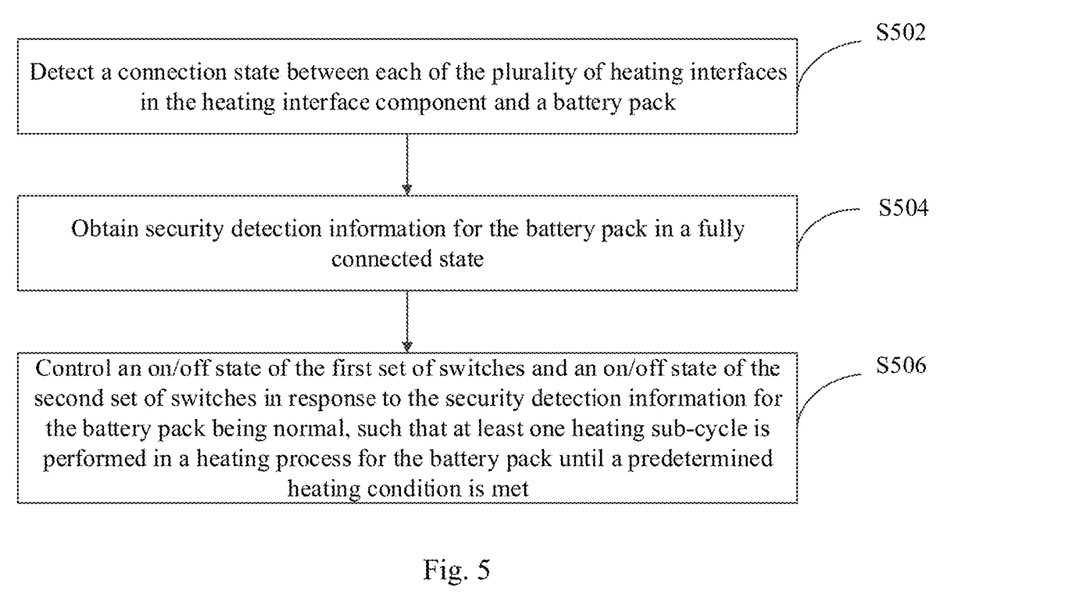
FIG. 5 is a flowchart illustrating a method of battery pack heating control according to an embodiment of the present disclosure.

In particular, referring to FIG. 5, the method of battery pack heating control according to the embodiment of the present disclosure includes the following steps.

At S502, a connection state between each of the plurality of heating interfaces in the heating interface component and a battery pack is detected.

At S504, security detection information for the battery pack in a fully connected state is obtained.

At S506, an on/off state of the first set of switches and an on/off state of the second set of switches are controlled in response to the security detection information for the battery pack being normal, such that at least one heating sub-cycle is performed in a heating process for the battery pack until a predetermined heating condition is met.

Figure 6:
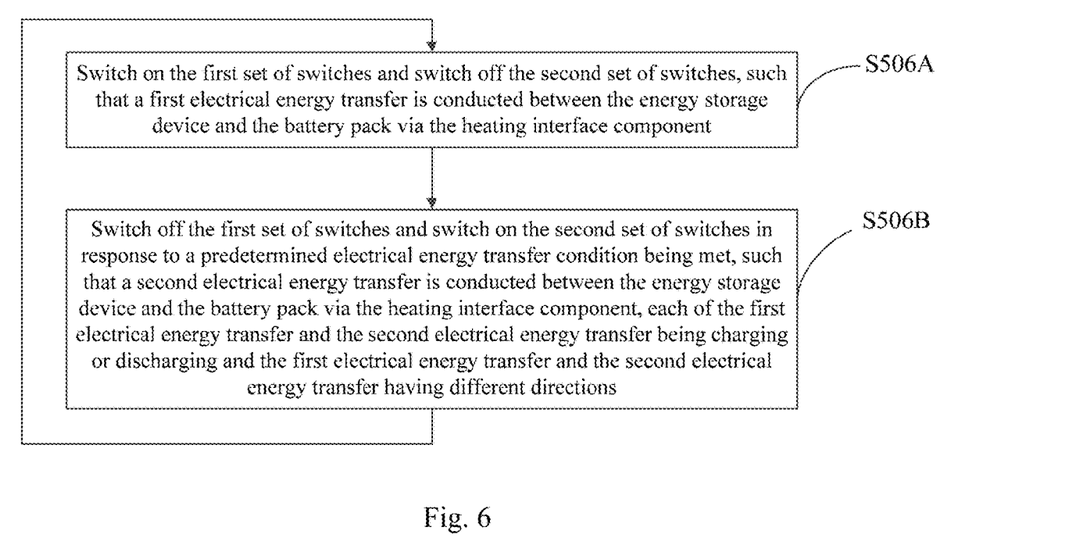
FIG. 6 shows a control method in a heating sub-cycle in a method of battery pack heating control according to an embodiment of the present disclosure.

Here, referring to FIG. 6, the method control includes the following steps in each heating sub-cycle.

At S506A, the first set of switches is switched on and the second set of switches is switched off, such that a first electrical energy transfer is conducted between the energy storage device and the battery pack via the heating interface component.

Here, in the embodiment of the present disclosure, a set of switches is switched on when all switch devices in the set are switched on, and a set of switches is switched off when all switch devices in the set are switched off.

At S506B, the first set of switches is switched off and the second set of switches is switched on in response to a predetermined electrical energy transfer condition being met, such that a second electrical energy transfer is conducted between the energy storage device and the battery pack via the heating interface component. Here, each of the first electrical energy transfer and the second electrical energy transfer is charging or discharging and the first electrical energy transfer and the second electrical energy transfer have different directions. That is, when the direction of the first electrical energy transfer is that the energy storage device stores energy and the battery pack releases energy (i.e., the battery pack charges the energy storage device), the direction of the second electrical energy transfer is that the energy storage device releases energy and the battery pack stores energy (i.e., the energy storage device charges the battery pack). On the other hand, when the direction of the first electrical energy transfer is that the energy storage device releases energy and the battery pack stores energy, the direction of the second electrical energy transfer is that the energy storage device stores energy and the battery pack releases energy.

As such, in a heating sub-cycle, the energy storage device stores and releases energy continuously. Correspondingly, the battery pack connected to the heating interface component releases and stores energy continuously. In this electrical energy transfer process, the battery pack generates heat continuously until a predetermined heating condition is met and the above heating sub-cycle is stopped then.

In particular, before the step S506A in the first heating sub-cycle, the first set of switches and the second set of switches are both switched off.

When the step S506B has been performed in any heating sub-cycle and it is required to determine when to enter a next heating sub-cycle, the method can further include: performing a step S506A of switching on the first set of switches and switching off the second set of switches in a next heating sub-cycle in response to the predetermined electrical energy transfer condition being met.

Here, the electrical energy transfer condition in the embodiment of the present disclosure can be predetermined as desired. For the purpose of illustration, two examples of the predetermined electrical energy transfer condition are described below according to the embodiment of the present disclosure.

In a first example, the predetermined electrical energy transfer condition is that a predetermined energy storage ratio threshold or energy release threshold of the energy storage device is met.

In performing this step, it is required to monitor in real time the energy storage ratio of the electrical energy received by the energy storage device to the energy stored therein. Accordingly, it is determined that the energy storage requirement is met in response to the energy storage ratio reaches the predetermined energy storage ratio threshold. Here, the energy storage ratio threshold can be set to an almost full status.

In a second example, the predetermined electrical energy transfer condition is that a predetermined electrical energy transfer time length is reached. The predetermined electrical energy transfer time length includes a discharging time length of the energy storage device and a charging time length of the energy storage device.

In performing this step, a timing function is started when the energy storage device starts storing energy. When the timing length reaches the charging time length of the energy storage device, a switching between the step S506A and the step S506B is performed, such that the energy storage device releases energy. The timing function is started again when the energy storage device starts releasing energy. When the timing length reaches the discharging time length of the energy storage device, a switching between the step S506A and the step S506B is performed again, such that the energy storage device stores energy. The above steps are performed cyclically to perform switching between the respective heating sub-cycles and switching between two switching steps in each heating sub-cycle. The charging time length may or may not be the same as the discharging time length and the present disclosure is not limited thereto. The charging time length can be constant or may increase or decrease gradually. The present disclosure is not limited to this.

In the embodiment of the present disclosure, in order to ensure the security of the heating process, before performing the control method in at least one heating sub-cycle in the step S506, the following steps are required:

detecting whether each heating interface is in a fully connected state;

obtaining the security detection information for the battery pack in response to detecting that the heating interface connected to the battery pack is in the fully connected state; and performing the step of controlling the on/off state of the first set of switches and the on/off state of the second set of switches in response to the security detection information for each battery pack being normal, such that at least one heating sub-cycle is performed in the heating process for the battery pack.

Here, the heating interface can be a charging gun and can be interfaced with a charging socket provided in the electrical vehicle so as to be connected to the battery pack. The connection state between the charging gun and the charging socket may include three states: fully connected, partially connected and unconnected.

For a heating interface that is to be connected to the battery pack, the security of the charging/discharging process can only be guaranteed when they are in the fully connected state. A heating interface that is not to be connected to a battery pack needs to be shorted such that the other connected battery packs can be connected in series.

The security detection information of each battery pack is obtained so as to determine that the battery pack is in a normal state based on the security detection information, thereby further improving the security of the heating process.

Here, in the embodiment of the present disclosure, the security detection information includes, but not limited to, insulation impedance detection information.

In addition, it may include other security detection information, including at least one of minimum state of charge detection information of the battery pack, a temperature of each battery pack or a voltage of each battery pack. It is to be noted here that a battery pack in a low temperature environment may have a low temperature and the temperature detection in this step may have a low secure temperature range, so as to determine to apply the heating control method based on the temperature of the battery pack in the low temperature environment. Similarly, for the voltage of the battery pack, a secure voltage range can be predetermined based on a low temperature environment and details thereof will be omitted here.

In a feasible implementation, the security detection information of the battery pack can be collected by a BMS of the vehicle where the individual batteries are installed. In this case, in performing the control method, the heating control module can instruct the BMS to transmit the security detection information collected by the BMS to the heating control module by communicating with the BMS. In this way, the heating control module can obtain the security detection information of each battery pack without any additional hardware for collection, which can simplify the structure of the device and can reduce the costs.

It is to be noted here that, before performing any heating sub-cycle in the control method, it is required to turn off relays in a main loop for each individual battery pack, including a main positive relay connected to a positive electrode of the battery pack and a main negative relay connected to a negative electrode of the battery pack, so as to ensure that the heat loop can be formed between the electrical energy conversion component and the battery pack. The operation of turning off the relays in the main loop is typically performed by a BMS of the battery pack. Then, before performing the step S506A or when determining to perform the step S506A after the above security detection, the heating control module can transmit to the BMS corresponding to the battery pack an instruction to turn off the relays in the main loop, such that the BMS can turn off the relays in the main loop of the individual battery pack currently connected in response to the instruction.

In the embodiment of the present disclosure, a security problem can be further considered. Hence, in an implementation, a corresponding security protection measure is taken, which may include the following steps of:

obtaining state information of the battery pack; and disabling an energy exchange between the battery pack and the energy storage device in response to any one or more pieces of state information in the state information being abnormal, so as to stop a current heating action.

Here, in the embodiment of the present disclosure, the state information may include, but not limited to, at least one of a voltage, a temperature of the battery pack, insulation impedance information, a state of charge or a current.

It is to be noted here that the condition information referred to in the security protection measure taken during the battery pack heating process may or may not be the same as the condition information referred to in the security protection measure taken before the battery pack heating process, as appropriate. The condition for determining the abnormality in the condition information before the battery pack heating process may or may not be the same as that for determining the abnormality in the condition information during the battery pack heating process.

Hence, in a specific implementation, depending on the structure of the battery pack heating apparatus, the following schemes can be used for disabling the energy exchange between the battery pack and the energy storage device.

In a first scheme, the first set of switches is switched off and the second set of switches is switched off.

In a second scheme, for the battery heating circuit as shown in FIG. 1, the heating interface component further includes a plurality of main loop switch devices connected in series to one of the heating interfaces. Any two neighboring main loop switch devices have one heating interface connected therebetween and any two neighboring heating interfaces have one main loop switch device connected therebetween. A positive connection terminal of the heating interface component is a terminal of the plurality of main loop switch devices that is directly connected with none of the heating interfaces, and a negative connection terminal of the heating interface component is a terminal of the heating interfaces that is directly connected with none of the plurality of main loop switch devices. The heating interface component further includes a current detector having a first terminal connected to a negative connection terminal of the first set of switches and a negative connection terminal of the second set of switches and a second terminal connected to a negative plate of the heating interface component. In this case, the operation of disabling the energy transfer between the battery pack and the energy storage device includes: switching off the main loop switch device and switching off the first set of switches and the second set of switches.

When the heating interface component detects an abnormality, it can switch off the main loop switch device immediately and switch off both the first set of switches and the second set of switches. This protection measure can avoid the problem of untimely switching off at least two switches in the first set of switches and the second set of switches to some extent, and can disable the electrical energy transfer between the battery pack and its heating device immediately, so as to reduce the heating security risk.

In the embodiment of the present disclosure, at least one heating sub-cycle is performed repeatedly by controlling the on/off state of the first set of switches and the on/off state of the second set of switches. Each heating sub-cycle includes an energy releasing process and an energy storing process of the battery pack. The battery pack is heated by the heat generated during the energy releasing and storing processes, until the predetermined heating condition is met.

In particular, the heating condition can be predetermined as at least one of a plurality of battery packs having a temperature reaching a predetermined heating temperature threshold.

In this case, a heating temperature threshold can be set for each of the plurality of battery packs. The heating temperature thresholds for the respective battery packs may or may not be the same. When different heating temperature thresholds are set, the predetermined heating condition can be a specified one of the battery packs having a temperature reaching its predetermined heating temperature threshold or at least one of the battery packs having a temperature reaching its predetermined heating temperature threshold.

Here, in a practical implementation, the heating control module can receive a heating temperature of the battery pack transmitted from a BMS, so as to allow the heating control module to monitor, determine and protect the heating process.

Based on the above method of battery pack heating control, according to an embodiment of the present disclosure, a computer readable storage medium is provided. The computer readable storage medium contains computer executable instructions which, when executed, perform the method of battery pack heating control according to any of the above embodiments.

For details of the system structure that are not described in the embodiment of the present disclosure, reference can be made to Embodiment 1.

The solution according to the embodiment of the present disclosure has the following advantageous effects.

With the method of battery pack heating control according to the embodiment of the present disclosure, the direction of the electrical energy transfer between the electrical energy conversion component and the battery pack can be controlled by controlling the on/off state of each of the first switch device and the second switch device in the electrical energy conversion component. When the first switch device and the second switch device are both switched on, the energy storage device receives electrical energy from the battery pack. When the first switch device and the second switch device are both switched off, the energy storage device is discharged to the battery pack. As such, by performing a plurality of such heating sub-cycles, each battery pack in the battery pack can continuously release and store energy. In this way, the battery pack can be heated directly by means of charging and discharging. During this process, the energy storage device does not need to be provided with any additional energy source or heat source and its energy may come from the battery pack in the electrical vehicle directly. The problem associated with the limited heating efficiency by a low power energy source can be avoided, and the heating efficiency can be improved while saving costs. Since each of the plurality of heating interfaces is connected in series with the electrical energy conversion component, the electrical energy conversion component can heat a plurality of battery packs simultaneously. As such, compared with the single-vehicle indirect heating scheme in the related art, the solution according to the embodiment of the present disclosure is capable of solving the problem in the related art that the single-vehicle indirect heating scheme can only heat one vehicle and has low heating efficiency.

It can be appreciated by those skilled in the art that, for the operations of the above described systems, apparatuses and units, reference can be made to the corresponding processes described in connection with the above method embodiments and details thereof will be omitted here for the sake of convenience and simplicity.

It can be appreciated from the embodiments of the present disclosure that the disclosed systems, apparatuses methods can be implemented in alternative ways. The apparatus embodiments as described above are illustrative only. For example, while the units have been divided in accordance with their logical functions, other divisions are possible in practice. For example, more than one unit or element can be combined or can be integrated into another system, or some features can be ignored or omitted. In addition, the coupling, direct coupling or communicative connection between various components as shown or discussed can be an indirect coupling or communicative connection via some interface, device or unit and can be electrical, mechanical or in another form.

The units described above as separated may or may not be physically separated. The components shown as units may or may not be physical units. They can be co-located or can be distributed over a number of network elements. Depending on actual requirements, some or all of the units can be selected to achieve the object of the present disclosure.

Further, all the functional units in various embodiments of the present disclosure can be integrated within one processing unit, each of these units can be a separate unit, or two or more units can be integrated into one unit. Such integrated unit can be implemented in hardware, possibly in combination with software functional units.

The above integrated units, when implemented in software function units, can be stored in a computer readable storage medium. The software function units can be stored in a storage medium, which may be any of various mediums capable of storing program codes, such as a USB disk, a mobile hard disk, a Read Only Memory (ROM), a Random Access Memory (RAM), a magnetic disk or an optical disc or the like, containing instructions which cause a computer device (which can be a personal computer, a server, a network device or the like) to perform at least a portion of the steps of the methods according to the embodiments of the present disclosure.

While the preferred embodiments of the present disclosure have been described above, the scope of the present disclosure is not limited thereto. Various modifications, equivalent alternatives or improvements can be made by those skilled in the art without departing from the scope of the present disclosure. These modifications, equivalent alternatives and improvements are to be encompassed by the scope of the present disclosure.

What is claimed is:

1. A battery pack heating apparatus, applicable portably and externally to a vehicle, comprising:
   an electrical energy conversion component, comprising an energy storage device, a first set of switches and a second set of switches;
   a heating interface component comprising a plurality of heating interfaces connected to the energy storage device via the first set of switches to form a first heating loop and connected to the energy storage device via the second set of switches to form a second heating loop, each of the plurality of heating interfaces being configured to be connected to a battery pack of one vehicle; and
   a heating control module configured to control a direction of electrical energy transfer between the electrical energy conversion component and the battery pack.

2. The battery pack heating apparatus of claim 1, wherein the heating interface component further comprises:
   a plurality of main loop switch devices connected in series to the plurality of heating interfaces, any two neighboring main loop switch devices having one heating interface connected therebetween and any two neighboring heating interfaces having one main loop switch device connected therebetween, a positive connection terminal of the heating interface component being a terminal of the plurality of main loop switch devices that is directly connected with none of the plurality of heating interfaces, and a negative connection terminal of the heating interface component being a terminal of the plurality of heating interfaces that is directly connected with none of the plurality of main loop switch devices,
   wherein each of the plurality of main loop switch devices is configured to disable an electrical energy transfer between the battery pack heating apparatus and the battery pack in case of an abnormality.

3. The battery pack heating apparatus of claim 1, wherein the first set of switches comprises a first switch device and a second switch device connected to two terminals of the energy storage device, respectively, and the first set of switches, the energy storage device and the heating interface component are electrically connected to form the first heating loop, and
   the second set of switches comprises a third switch device and a fourth switch device connected to two terminals of the energy storage device, respectively, and the second set of switches, the energy storage device and the heating interface component are electrically connected to form the second heating loop.

4. The battery pack heating apparatus of claim 3, wherein the first switch device has a first terminal connected to a first terminal of the energy storage device and a second terminal electrically connected to a positive plate of the heating interface component,
   the second switch device has a first terminal connected to a second terminal of the energy storage device and a second terminal electrically connected to a negative plate of the heating interface component,
   the third switch device has a first terminal connected to a third terminal of the energy storage device and a second terminal electrically connected to the positive plate of the heating interface component, and
   the fourth switch device has a first terminal connected to a fourth terminal of the energy storage device and a second terminal electrically connected to the negative plate of the heating interface component.

5. The battery pack heating apparatus of claim 1, further comprising:
   a current detector having a first terminal connected to a negative connection terminal of the first set of switches and a negative connection terminal of the second set of switches and a second terminal connected to a negative plate of the heating interface component, and configured to detect a current value of the first heating loop or the second heating loop,
   wherein the heating control module is further configured to obtain the current value detected by the current detector, so as to determine whether an abnormality has occurred based on the current value.

6. The battery pack heating apparatus of claim 1, further comprising:
   a protection circuit comprising a plurality of switch protection components and a protection capacitor component, wherein each of the plurality of switch protection components is connected in parallel with one switch device of the first set of switches or the second set of switches, and configured to reduce a loss or avoid a damage during a switch-off process of the one switch device, and the protection capacitor component comprises one or more capacitors, and the protection capacitor component is connected in parallel with the first heating loop and the second heating loop and configured to avoid a voltage peak when the first set of switches or the second set of switches is switched on.

7. The battery pack heating apparatus of claim 1, wherein each of the plurality of heating interfaces is a charging gun.

8. A method of battery pack heating control, applied in the battery pack heating apparatus according to claim 1 and performed by the heating control module, the method comprising:

detecting a connection state between each of the plurality of heating interfaces in the heating interface component and the battery pack;

obtaining security detection information for the battery pack in a fully connected state; and controlling an on/off state of the first set of switches and an on/off state of the second set of switches in response to the security detection information for the battery pack being normal, such that at least one heating sub-cycle is performed in a heating process for the battery pack until a predetermined heating condition is met, wherein the method comprises, in each heating sub-cycle:

switching on the first set of switches and switching off the second set of switches, such that a first electrical energy transfer is conducted between the energy storage device and the battery pack via the heating interface component; and switching off the first set of switches and switching on the second set of switches in response to a predetermined electrical energy transfer condition being met, such that a second electrical energy transfer is conducted between the energy storage device and the battery pack via the heating interface component, wherein each of the first electrical energy transfer and the second electrical energy transfer is charging or discharging and the first electrical energy transfer and the second electrical energy transfer have different directions.

9. The method of claim 8, further comprising:

performing a step of switching on the first set of switches and switching off the second set of switches in a next heating sub-cycle in response to the predetermined electrical energy transfer condition being met.

10. The method of claim 8, wherein the predetermined electrical energy transfer condition comprises:

a predetermined energy storage ratio threshold or energy release threshold of the energy storage device being met; or a predetermined electrical energy transfer time length being reached, the predetermined electrical energy transfer time length comprising a discharging time length of the energy storage device and a charging time length of the energy storage device.

11. The method of claim 9, wherein the predetermined electrical energy transfer condition comprises:

a predetermined energy storage ratio threshold or energy release threshold of the energy storage device being met; or a predetermined electrical energy transfer time length being reached, the predetermined electrical energy transfer time length comprising a discharging time length of the energy storage device and a charging time length of the energy storage device.

12. The method of claim 8, wherein the security detection information comprises at least one of insulation impedance detection information, minimum state of charge detection information of the battery pack, a temperature of the battery pack or a voltage of the battery pack.

13. The method of claim 8, further comprising:

obtaining state information of the battery pack; and disabling an electrical energy transfer between the battery pack and the energy storage device in response to any one or more pieces of state information in the state information being abnormal, so as to stop a current heating action.

14. The method of claim 13, wherein the state information comprises at least one of a voltage, a temperature of the battery pack, insulation impedance information, a state of charge or a current.

15. The method of claim 13, wherein said disabling the electrical energy transfer between the battery pack and the energy storage device comprises:

switching off the first set of switches and switching off the second set of switches.

16. The method of claim 13, wherein, when the heating interface component further comprises a plurality of main loop switch devices connected in series to the plurality of heating interfaces, any two neighboring main loop switch devices having one heating interface connected therebetween and any two neighboring heating interfaces having one main loop switch device connected therebetween, a positive connection terminal of the heating interface component being a terminal of the plurality of main loop switch devices that is directly connected with none of the plurality of heating interfaces, and a negative connection terminal of the heating interface component being a terminal of the plurality of heating interfaces that is directly connected with none of the plurality of main loop switch devices, said disabling the electrical energy transfer between the battery pack and the energy storage device comprises:

switching off the plurality of main loop switch devices and switching off the first set of switches and the second set of switches.

17. The method of claim 8, wherein the predetermined heating condition comprises: at least one of a plurality of battery packs having a temperature reaching a predetermined heating temperature threshold.

* * * * *